United States Patent
Farrow et al.

(10) Patent No.: US 9,454,192 B2
(45) Date of Patent: Sep. 27, 2016

(54) COMPONENT RETENTION MECHANISM (71) Applicant: LENOVO (SINGAPORE) PTE. LTD., Singapore (SG)

(72) Inventors: Timothy Samuel Farrow, Cary, NC (US); Ali Kathryn Ent, Garner, NC (US); Shuang Li, Shenzhen (CN); Albert Vincent Makley, Morrisville, NC (US); Sean Hilliard, Anderson, SC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 156 days.

(21) Appl. No.: 14/229,881

(22) Filed: Mar. 29, 2014

(65) Prior Publication Data
US 2015/0277515 A1 Oct. 1, 2015

(51) Int. Cl.
*G06F 1/18* (2006.01)

(52) U.S. Cl.
CPC .............. *G06F 1/187* (2013.01); *G06F 1/181* (2013.01)

(58) Field of Classification Search
CPC .................................. G06F 1/187; G06F 1/18
See application file for complete search history.

(56) References Cited

U.S. PATENT DOCUMENTS

| | | | | |
|---|---|---|---|---|
| 5,065,262 A | * | 11/1991 | Blackborow | G06F 1/18 360/75 |
| 5,740,012 A | * | 4/1998 | Choi | G06F 1/1616 361/679.39 |
| 5,825,616 A | * | 10/1998 | Howell | G06F 1/1616 361/679.38 |
| 6,088,222 A | * | 7/2000 | Schmitt | E05B 63/143 312/332.1 |
| 6,381,146 B1 | * | 4/2002 | Sevier | H05K 7/1411 200/51 R |
| 6,507,487 B1 | * | 1/2003 | Barina | G06F 1/187 312/236 |
| 6,538,882 B2 | * | 3/2003 | Branch | G06F 13/6275 361/679.02 |
| 6,830,385 B2 | * | 12/2004 | Ishigami | G02B 6/3897 385/53 |
| 6,855,558 B1 | * | 2/2005 | Hattori | H01R 13/62933 385/53 |
| 6,887,092 B2 | * | 5/2005 | Minota | H01R 13/62933 439/160 |

(Continued)

*Primary Examiner* — Xanthia C Cunningham
(74) *Attorney, Agent, or Firm* — Brian J. Pangrle (57) ABSTRACT

A computing system can include a processor; memory accessible by the processor; a drive bay chassis that includes opposing side walls that define a width of a drive bay; a drive accessible by the processor and disposed in the drive bay; a biasing mechanism operatively coupled to the drive bay chassis; a movable bracket biased by the biasing mechanism where the bracket includes at least one extension, a first orientation with respect to the drive bay chassis that orients the bracket in a latchable state of the at least one extension with respect to the drive in the drive bay and a second orientation with respect to the drive bay chassis that orients the bracket in an unlatchable state of the at least one extension with respect to the drive in the drive bay. Various other apparatuses, systems, methods, etc., are also disclosed.

18 Claims, 10 Drawing Sheets

(56) References Cited

U.S. PATENT DOCUMENTS

| | | | |
|---|---|---|---|
| 6,950,313 B1* | 9/2005 | Shih | H05K 7/1408 361/679.31 |
| 7,108,429 B2* | 9/2006 | Kurashima | G02B 6/4246 385/53 |
| 7,133,296 B2* | 11/2006 | Choi | H01R 13/641 361/732 |
| 7,186,134 B2* | 3/2007 | Togami | H01R 13/6275 439/160 |
| 7,261,475 B2* | 8/2007 | Sasaki | G02B 6/4246 385/88 |
| 7,314,384 B2* | 1/2008 | Togami | H01R 13/6275 439/160 |
| 7,385,809 B2* | 6/2008 | Graffius | B60R 11/0235 292/57 |
| 7,441,744 B2* | 10/2008 | Chen | G06F 1/187 248/309.1 |
| 7,480,963 B2* | 1/2009 | Liang | G11B 33/025 16/422 |
| 7,517,160 B2* | 4/2009 | Miyoshi | G02B 6/4201 385/53 |
| 7,766,686 B2* | 8/2010 | Gu | G02B 6/4201 439/372 |
| 7,841,779 B1* | 11/2010 | Bianchini | G92B 6/4201 385/135 |
| 7,864,521 B2* | 1/2011 | Chen | G06F 1/187 211/26 |
| 7,896,570 B2* | 3/2011 | Gannon | F16B 2/12 361/801 |
| 7,911,777 B2* | 3/2011 | Fan | G06F 1/187 312/223.1 |
| 8,040,687 B2* | 10/2011 | Pirillis | H05K 7/1412 361/801 |
| 8,061,535 B2* | 11/2011 | Cheng-Yuan | G11B 33/127 211/26 |
| 8,157,454 B2* | 4/2012 | Ito | G02B 6/4292 385/136 |
| 8,164,921 B2* | 4/2012 | Dong | H04M 1/0274 361/679.01 |
| 8,199,513 B2* | 6/2012 | Benedetto | H04Q 1/142 361/747 |
| 8,335,088 B2* | 12/2012 | Pirillis | H05K 7/1412 361/801 |
| 8,336,838 B2* | 12/2012 | Tsai | G06F 1/187 248/220.21 |
| 8,379,380 B2* | 2/2013 | Zhang | G06F 1/1658 312/223.1 |
| 8,430,367 B2* | 4/2013 | Tu | G11B 33/126 248/220.21 |
| 8,439,320 B2* | 5/2013 | Huang | G11B 33/124 248/220.22 |
| 8,717,770 B2* | 5/2014 | Nguyen | G02B 6/4292 361/730 |
| 8,755,191 B2* | 6/2014 | Riebel | H05K 7/1488 361/679.38 |
| 8,807,500 B2* | 8/2014 | Han | G11B 33/124 248/200 |
| 9,028,155 B2* | 5/2015 | Wang | G02B 6/4261 385/92 |
| 9,042,702 B2* | 5/2015 | Rodriguez | G02B 6/36 385/134 |
| 9,122,458 B2* | 9/2015 | Yu | G06F 1/185 |
| 2002/0142649 A1* | 10/2002 | Baugh | H01R 13/633 439/532 |
| 2003/0030988 A1* | 2/2003 | Garnett | G06F 1/183 361/724 |
| 2003/0044129 A1* | 3/2003 | Ahrens | G02B 6/3897 385/92 |
| 2003/0201902 A1* | 10/2003 | Post | G06F 13/409 340/693.5 |
| 2004/0100762 A1* | 5/2004 | Yuan | G06F 1/184 361/679.39 |
| 2004/0264042 A1* | 12/2004 | Pollard | G11B 15/6835 360/92.1 |
| 2005/0087504 A1* | 4/2005 | Wu | G11B 33/128 211/26 |
| 2005/0157474 A1* | 7/2005 | Larson | H01R 13/6335 361/728 |
| 2005/0243507 A1* | 11/2005 | Lambert | G06F 1/187 361/679.39 |
| 2005/0282425 A1* | 12/2005 | Lloyd | G02B 6/4277 439/372 |
| 2006/0061956 A1* | 3/2006 | Chen | G11B 33/124 361/679.4 |
| 2007/0217144 A1* | 9/2007 | Peng | G06F 1/187 361/679.39 |
| 2007/0297128 A1* | 12/2007 | Chen | G06F 1/187 361/679.31 |
| 2008/0080129 A1* | 4/2008 | Morris | G06F 1/187 361/679.33 |
| 2008/0239648 A1* | 10/2008 | Okamoto | G06F 1/183 361/725 |
| 2008/0282278 A1* | 11/2008 | Barkley | G11B 33/126 720/672 |
| 2010/0067199 A1* | 3/2010 | Chen | G02B 6/4201 361/747 |
| 2010/0142898 A1* | 6/2010 | Teo | H01R 13/6275 385/88 |
| 2010/0172082 A1* | 7/2010 | Chen | G06F 1/187 361/679.31 |
| 2012/0020029 A1* | 1/2012 | Peng | G11B 33/124 361/732 |
| 2012/0113583 A1* | 5/2012 | Peng | G06F 1/187 361/679.39 |
| 2013/0208413 A1* | 8/2013 | Huang | G06F 1/183 361/679.31 |
| 2013/0210275 A1* | 8/2013 | Fish | H01R 13/6658 439/620.01 |
| 2013/0346657 A1* | 12/2013 | Bhatta | G06F 13/385 710/107 |
| 2014/0126144 A1* | 5/2014 | Kyle | G06F 1/16 361/679.58 |
| 2014/0362515 A1* | 12/2014 | Pronozuk | H05K 7/1488 361/679.31 |
| 2015/0022964 A1* | 1/2015 | Ding | G11B 33/02 361/679.39 |
| 2015/0043151 A1* | 2/2015 | Cravens | G06F 1/187 361/679.37 |

* cited by examiner

COMPONENT RETENTION MECHANISM

TECHNICAL FIELD

Subject matter disclosed herein generally relates to technology for a computing system.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A computing system can include various components such as a processor, memory and one or more storage devices. A storage device may be positioned in a bay of a computing system. For example, a storage device may be a media drive that may be positioned in bay via one or more mechanisms.

SUMMARY

A computing system can include a processor; memory accessible by the processor; a drive bay chassis that includes opposing side walls that define a width of a drive bay; a drive accessible by the processor and disposed in the drive bay; a biasing mechanism operatively coupled to the drive bay chassis; a movable bracket biased by the biasing mechanism where the bracket includes at least one extension, a first orientation with respect to the drive bay chassis that orients the bracket in a latchable state of the at least one extension with respect to the drive in the drive bay and a second orientation with respect to the drive bay chassis that orients the bracket in an unlatchable state of the at least one extension with respect to the drive in the drive bay. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
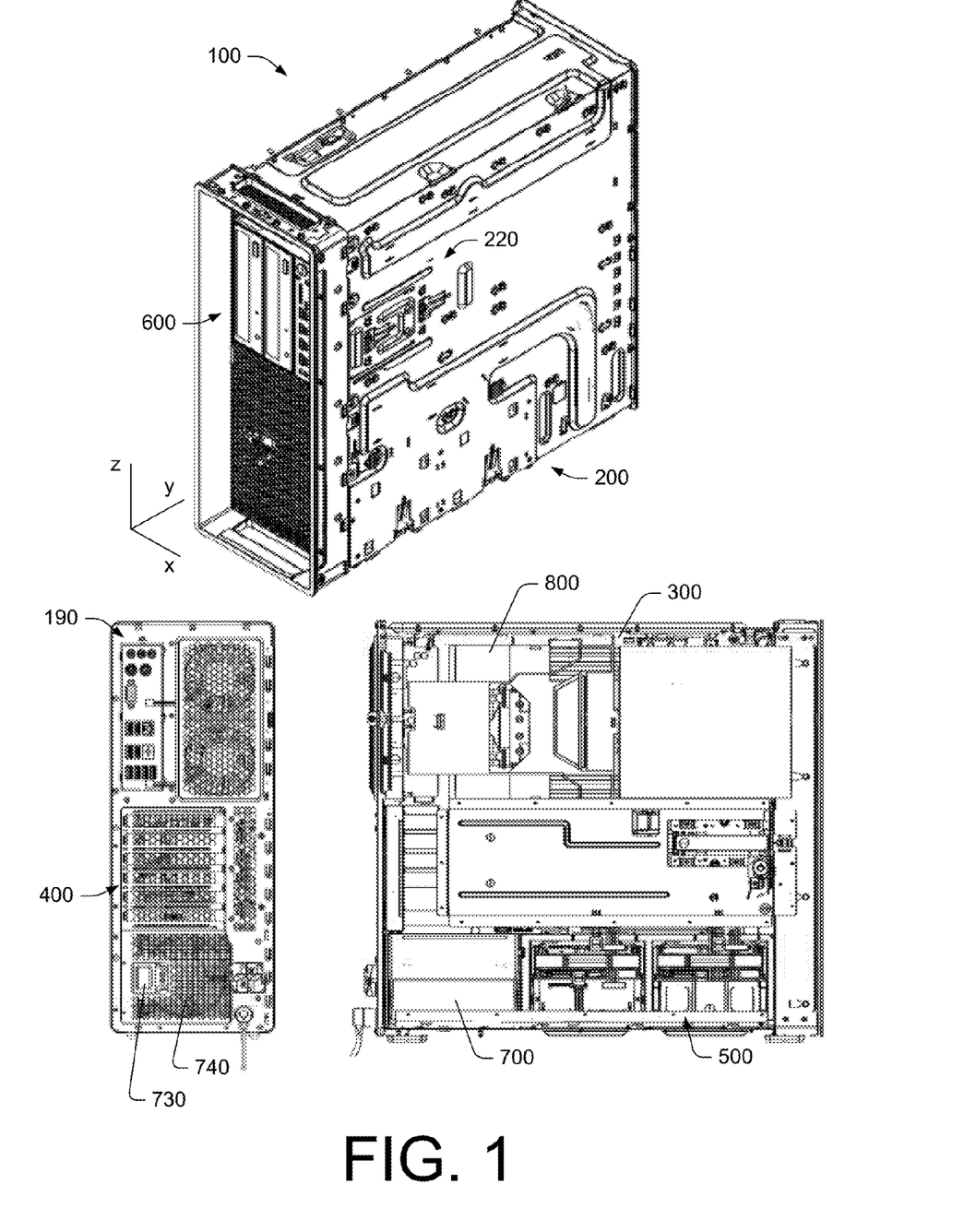
FIG. 1 is a series of diagrams of views of an example of a computing system.

FIG. 1 shows an example of a computing system 100. As an example, the computing system 100 may be a workstation, for example, configured to handle information, which may include one or more of processing information, storing information, receiving information and transmitting information. The computing system 100 can include connectors 190, for example, to connect the computing system 100 to one or more peripherals, networks, etc. As an example, the computing system 100 may include wireless circuitry for wireless connection to one or more peripherals, networks, etc.

As shown in the example of FIG. 1, the computing system includes 100 includes a chassis 200, a board 300, slots 400, bays 500, bays 600, a power supply unit 700 and air flow features 800. As an example, a cover may be fitted to the chassis 200, which may include one or more panels. As an example, a panel may be a lockable panel where, in an unlocked state, it may be removed for access to various components in the computing system 100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 200.

In the example of FIG. 1, the computing system 100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 100 may be oriented on its bottom end where gravity may be aligned with the z-axis or, for example, the computing system 100 may be oriented on one of its sides where gravity may be aligned with the x-axis (e.g., with the left side facing upward and the right side facing downward).

In the example of FIG. 1, the chassis 200 includes a mechanism for limiting movement of the board 300 (e.g., at least along the y-axis). As shown, the board 300 may be positioned substantially in a y,z-plane and may include various slots 400 for receipt of one or more components (e.g., cards, etc.), which may extend outwardly from the board 300 (e.g., at least in part along the x-axis).

As to the bays 500 and the bays 600, these may be defined at least in part by the chassis 200. As shown, the bays 500 and the bays 600 may include one or more bays accessible via the front end of the computing system 100 (see, e.g., the bays 600) and may include one or more bays accessible via one or both of the sides of the computing system 100 such as, for example, the left side of the computing system 100 (see, e.g., the bays 500).

In the example of FIG. 1, the computing system 100 includes the power supply unit 700, which includes a connector 730 for receipt of power (e.g., via a power cord) and which may include a fan 740 (e.g., or fans). The power supply unit 700 may provide power to various components of the computing system 100.

As shown in the example of FIG. 1, the chassis 200 includes various openings that may facilitate flow of air. In operation, the front end and the back end of the computing system 100 may be positioned with respective clearances from other environmental structures (e.g., shelves, desks, walls, equipment, etc.), for example, to not unduly hinder flow of air. Air flow through the computing system 100 may be guided by one or more of the air flow features 800. As an example, the computing system 100 may include one or more baffles. As an example, the computing system 100 may include one or more fans. As an example, fans may be operated in series, for example, where air moved by one fan includes air moved by another fan. For example, a fan disposed in a first x,z-plane of the computing system 100 may move air at least in part along the y-axis (e.g., into the computing system 100) where another fan disposed in a second x,z-plane of the computing system 100 receives at least a portion of that air and moves it at least in part along the y-axis (e.g., out of the computing system 100). As mentioned, the power supply assembly 700 may include the fan 740 (e.g., or fans).

In the example of FIG. 1, the board 300 of the computing system 100 can include one or more processors and memory accessible by at least one of the one or more processors. One or more of the bays 500 and/or the bays 600 of the computing system 100 may include one or more storage devices, which may be accessible by at least one of the one or more processors.

As an example, a computing system may include various types of bays (e.g., consider a bay for a component specified at least in part by a 5.25 inch standard, a bay for a component specified at least in part by a 3.5 inch standard, a 2.5 inch standard, etc.). In the example of FIG. 1, two of the bays 600 are shown as being accessible via the front end of the computing system 100. In such an example, the location of the bays 600 may provide for insertion and removal of media, for example, without removal, movement, etc. of a panel of the computing system 100. In the example of FIG. 1, at least one of the two of the bays 600 may be specified at least in part by a 5.25 inch standard.

As an example, a bay may be configured for receipt of a media drive, which may be a standard media drive, for example, a standard drive specified by a SFF specification (e.g., SFF-8000), an ASC specification, an EIA specification, an IEC specification, etc. For example, a "5.25 inch" drive includes four openings on each side of the drive spaced at corners of a rectangle with a length of 3.12 in (79.24 mm) and a width of 0.47 in (11.9 mm) where the rectangle is offset towards the lower and front edges of the sides of the drive. In a SFF specification, such a drive has a length of about 8 in (204.7 mm), a height of about 3.25 in (82.55 mm) and a width of about 5.75 in (146.05 mm). As an example, a media drive may be a DVD read/write SATA drive.

Figure 2:
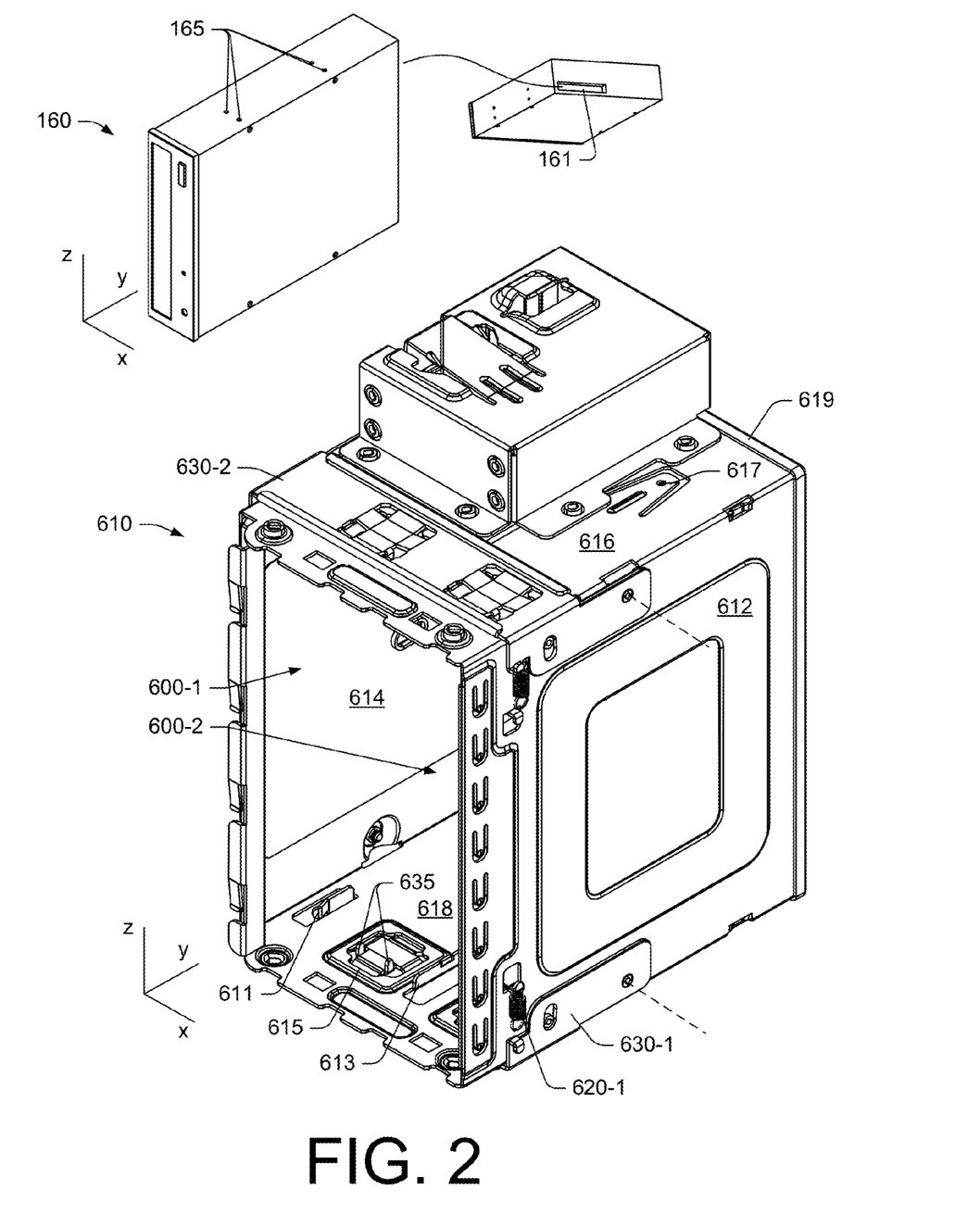
FIG. 2 is a series of diagrams of views of an example of a component and an example of an assembly.

FIG. 2 shows an example of a media drive 160 that includes a connector 161 and mounting features 165 and an example of a drive bay chassis 610 that includes opposing side walls 616 and 618 that define a width of a bay 600-1 and a width of a bay 600-2. As an example, the media drive 160 may be disposed at least partially in the bay 600-1 or 600-2.

As shown in the example of FIG. 2, the drive bay chassis 610 includes another pair of walls 612 and 614 that are operatively coupled to the side walls 616 and 618. In the example of FIG. 2, the walls 612, 614, 616 and 618 define a chamber therein, for example, together with a back wall 619. The chamber may be defined with respect to a depth along the y-axis and an opening in a x,z-plane. As shown, guides 616 and 613 may extend from the side wall 618 (e.g., and optionally the side wall 616) to guide a drive in one or more of the bays 600-1 and 600-2. The guide 613 may be a dividing guide that, on one side, guides a drive with respect to the bay 600-1 and that, on another side, guides a drive with respect to the bay 600-2. As an example, the guide 611 may provide a space between a drive in the bay 600-1 and the wall 614.

Also shown in FIG. 2 are one or more movable brackets 630-1 and 630-2 that are operatively coupled to one or more biasing mechanisms 620-1 and 620-2 that are operatively coupled to the drive bay chassis 610. In the example of FIG. 2, the moveable bracket 630-1 includes at least one extension 635 that may be oriented by movement of the moveable bracket 630-1 with respect to the drive bay chassis 610. For example, the moveable bracket 630-1 may be pivoted about a pivot axis (see dashed line) that can orient the at least one extension 635 to extend into the bay 600-1 or not.

As shown in the example of FIG. 2, the side wall 618 of the drive bay chassis 610 includes an opening 615 that can receive the at least one extension 635 of the moveable bracket 630-1. In a received orientation, the at least one extension 635 extends at least along the z-direction into the bay 600-1 where it may be received by a mounting feature of a drive. For example, the drive 160 may include mounting features on the side not shown that are equivalent to the mounting features 165.

As an example, a method may include translating the drive 160 into the bay 600-1 in a y-direction (e.g., as guided by the guides 611 and 613) whereby a side of the drive 160 pushes the at least one extension 635 outwardly from the bay 600-1 such that the moveable bracket 630-1 pivots about its pivot axis in a manner that causes the biasing mechanism 620-1 to experience strain (e.g., to stretch). In such a method, during translation, the mounting features (see, e.g., the mounting features 165) may reach a position that allows the at least one extension 635 to be received thereby. For example, the at least one extension 635 may be a prong or prongs and the mounting features 165 may be openings that can receive the prong or prongs. Once received, the drive 160 is latched in the bay 600-1 at least in part by the biasing force exerted by the biasing mechanism 620-1 on the moveable bracket 630-1. In the example of FIG. 2, one or more of the side walls 616 and 618 may include a tab such as the tab 617 of the side wall 616. As shown, the tab 617 may extend into the bay 600-2 and function to limit side-to-side movement of a drive in the bay 600-2; noting that the side wall 618 may include an opposing tab.

The aforementioned method may be considered an installation or insertion method. In contrast, a method may be a removal method, for example, to remove a drive from a bay of the drive chassis 610 (e.g., for maintenance, replacement, etc.).

As an example, a method may include pivoting the moveable bracket 630-1 about its pivot axis to cause the at least one extension to move outwardly away from the bay 600-1 in a manner that causes the at least one extension 635 and mounting features of a drive in the bay 600-1 to disengage. Once disengaged, the drive may be translated along a y-direction for removal from the bay 600-1.

In the example of FIG. 2, two moveable brackets 630-1 and 630-2 are shown. In such an example, for removal of a drive from the bay 600-1 or the bay 600-2, both of the moveable brackets 630-1 and 630-2 may be pivoted about a respective pivot axis (see, e.g., dashed lines).

As explained with respect to the example of FIG. 2, a movable bracket may be biased by a biasing mechanism where the bracket includes at least one extension, a first orientation with respect to a drive bay chassis that orients the bracket in a latchable state of the at least one extension with respect to a drive in a drive bay and a second orientation with respect to the drive bay chassis that orients the bracket in an unlatchable state of the at least one extension with respect to the drive in the drive bay.

Figure 3:
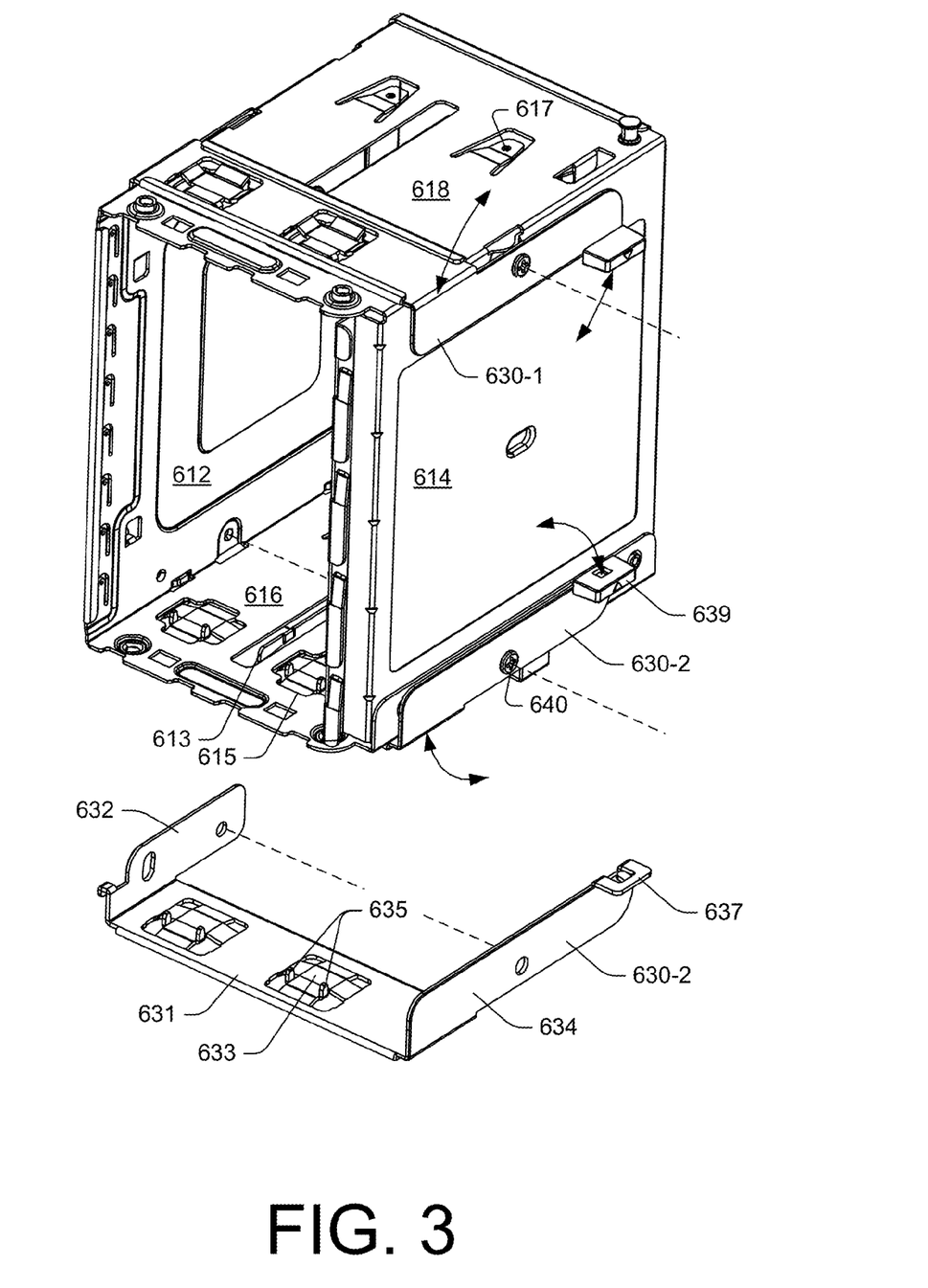
FIG. 3 is a diagram of a view of the assembly of FIG. 2.

FIG. 3 shows another view of the assembly of FIG. 2 and an isolated view of the moveable bracket 630-1. FIG. 3 shows arrows that represent pivot directions of the moveable brackets 630-1 and 630-2. As an example, a component 640 (e.g., a bolt, screw, post, etc.) may be included to define a pivot axis and, for example, to act as an axel for pivoting of the moveable bracket 630-2. As shown, the moveable bracket 630-2 can include a member 631 that is coupled to a lower member 632 and an upper member 634. As an example, the member 631 may include a bridge 633 from which the at least one extension 635 extends. As an example, the moveable bracket 630-2 may include a handle feature 637 that may be configured to receive a cap 639 (e.g., with a directional arrow, other indicia, etc.). As an example, the moveable bracket 630-2 may be formed from a piece of sheet metal. For example, a stamping process may stamp and/or bend a piece of sheet metal to form a moveable bracket.

As an example, the drive bay chassis 610 may include features for operatively coupling to the chassis 200. Referring to FIG. 1, the side view (lower right) shows a drive bay chassis located in the upper right of the computing system 100. A cover may be positioned over the drive bay chassis that upon removal thereof may provide for access to one or more moveable brackets (e.g., a handle feature of a moveable bracket, etc.). As an example, a person may using a left hand pivot a moveable bracket or moveable brackets of a drive bay chassis and slide a drive or drives out of the drive bay chassis using a right hand (e.g., or vice versa as to the left and right hands). As explained, this may be a one person task that may be achieved, for example, without using tools.

Figure 4:
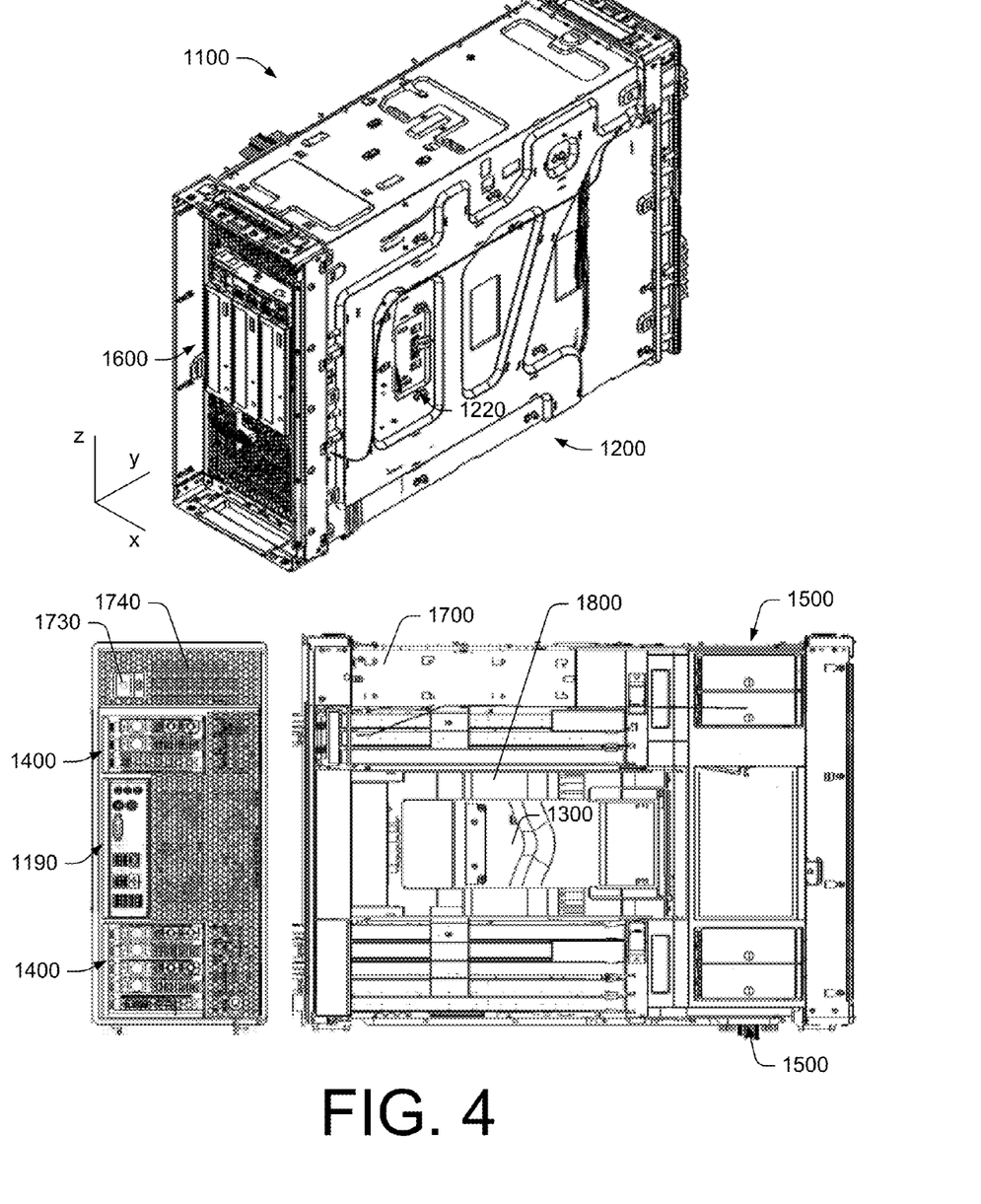
FIG. 4 is a diagram of a view of an example of an assembly that includes components in bays.

FIG. 4 shows an example of a computing system 1100. As an example, the computing system 1100 may be a workstation, for example, configured to handle information, which may include one or more of processing information, storing information, receiving information and transmitting information. The computing system 1100 can include connectors 1190, for example, to connect the computing system 1100 to one or more peripherals, networks, etc. As an example, the computing system 1100 may include wireless circuitry for wireless connection to one or more peripherals, networks, etc.

As shown in the example of FIG. 4, the computing system includes 1100 includes a chassis 1200, a board 1300, slots 1400, bays 1500, bays 1600, a power supply unit 1700 and air flow features 1800. As an example, a cover may be fitted to the chassis 1200, which may include one or more panels. As an example, a panel may be a lockable panel where, in an unlocked state, it may be removed for access to various components in the computing system 1100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 1200.

In the example of FIG. 4, the computing system 1100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 1100 may be oriented on its bottom end where gravity may be aligned with the z-axis or, for example, the computing system 1100 may be oriented on one of its sides where gravity may be aligned with the x-axis (e.g., with the left side facing upward and the right side facing downward).

In the example of FIG. 4, the chassis 1200 includes a mechanism for limiting movement of the board 1300 (e.g., at least along the y-axis). As shown, the board 1300 may be positioned substantially in a y,z-plane and may include various slots 1400 for receipt of one or more components (e.g., cards, etc.), which may extend outwardly from the board 1300 (e.g., at least in part along the x-axis).

As to the bays 1500 and the bays 1600, these may be defined at least in part by the chassis 1200. As shown, the bays 1500 and the bays 1600 may include one or more bays accessible via the front end of the computing system 1100 (see, e.g., the bays 1600) and may include one or more bays accessible via one or both of the sides of the computing system 1100 such as, for example, the left side of the computing system 1100 (see, e.g., the bays 1500).

In the example of FIG. 4, the computing system 1100 includes the power supply unit 1700, which includes a connector 1730 for receipt of power (e.g., via a power cord) and which may include a fan 1740 (e.g., or fans). The power supply unit 1700 may provide power to various components of the computing system 1100.

As shown in the example of FIG. 4, the chassis 1200 includes various openings that may facilitate flow of air. In operation, the front end and the back end of the computing system 1100 may be positioned with respective clearances from other environmental structures (e.g., shelves, desks, walls, equipment, etc.), for example, to not unduly hinder flow of air. Air flow through the computing system 1100 may be guided by one or more of the air flow features 800. As an example, the computing system 1100 may include one or more baffles. As an example, the computing system 1100 may include one or more fans. As an example, fans may be operated in series, for example, where air moved by one fan includes air moved by another fan. For example, a fan disposed in a first x,z-plane of the computing system 1100 may move air at least in part along the y-axis (e.g., into the computing system 100) where another fan disposed in a second x,z-plane of the computing system 1100 receives at least a portion of that air and moves it at least in part along the y-axis (e.g., out of the computing system 100). As mentioned, the power supply assembly 1700 may include the fan 1740 (e.g., or fans).

In the example of FIG. 4 the board 1300 of the computing system 1100 can include one or more processors and memory accessible by at least one of the one or more processors. One or more of the bays 1500 and/or the bays 1600 of the computing system 1100 may include one or more storage devices, which may be accessible by at least one of the one or more processors.

As an example, a computing system may include various types of bays (e.g., consider a bay for a component specified at least in part by a 5.25 inch standard, a bay for a component specified at least in part by a 3.5 inch standard, a 2.5 inch standard, etc.). In the example of FIG. 4, three of the bays 1600 are shown as being accessible via the front end of the computing system 1100. In such an example, the location of the bays 1600 may provide for insertion and removal of media, for example, without removal, movement, etc. of a panel of the computing system 1100. In the example of FIG. 4, at least one of the three of the bays 1600 may be specified at least in part by a 5.25 inch standard.

As an example, a bay may be configured for receipt of a media drive, which may be a standard media drive, for example, a standard drive specified by a SFF specification (e.g., SFF-8000), an ASC specification, an EIA specification, an IEC specification, etc. For example, a "5.25 inch" drive includes four openings on each side of the drive spaced at corners of a rectangle with a length of 3.12 in (79.24 mm) and a width of 0.47 in (11.9 mm) where the rectangle is offset towards the lower and front edges of the sides of the drive. In a SFF specification, such a drive has a length of about 8 in (204.7 mm), a height of about 3.25 in (82.55 mm) and a width of about 5.75 in (146.05 mm). As an example, a media drive may be a DVD read/write SATA drive.

Figure 5:
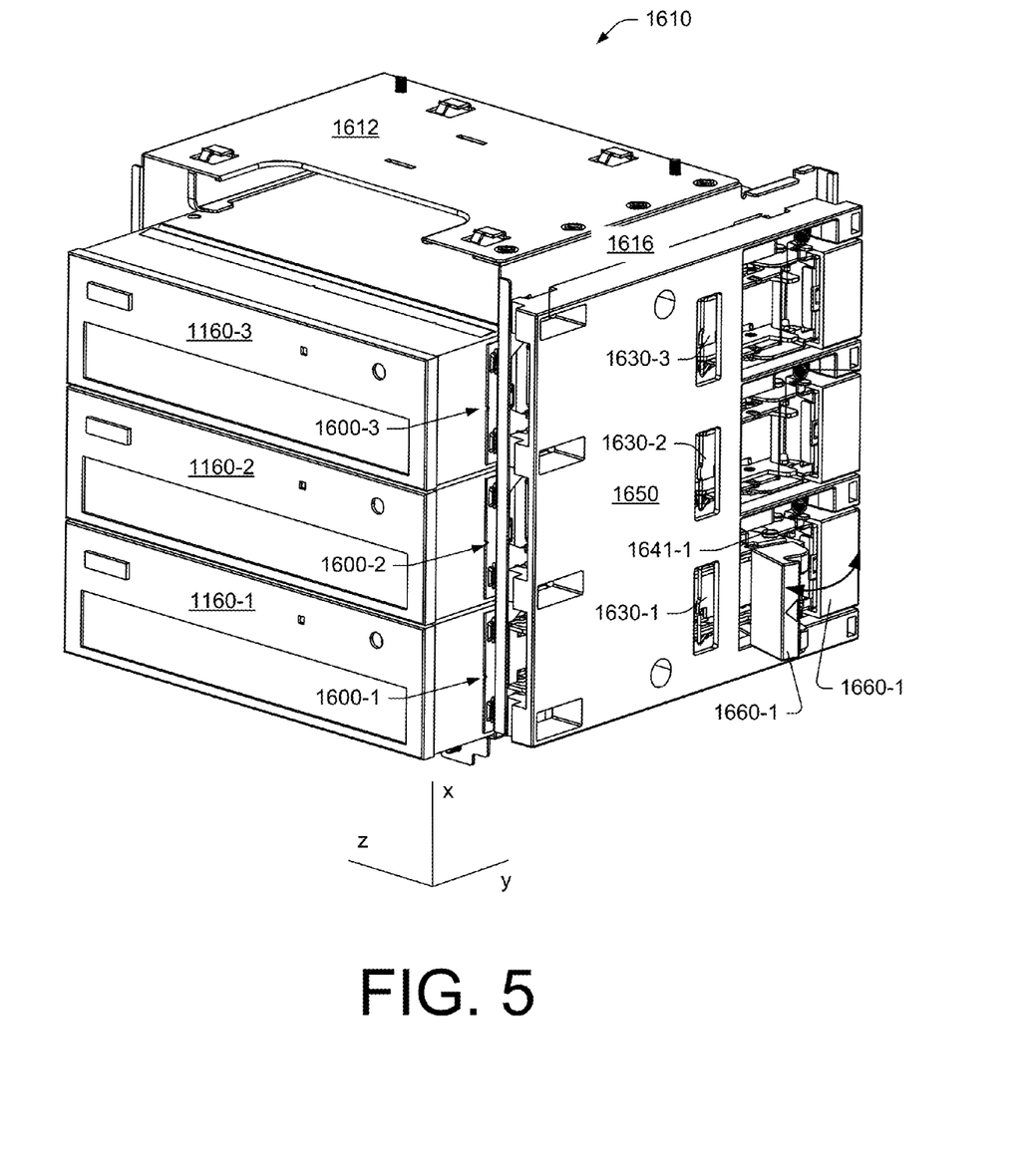
FIG. 5 is a diagram of another view of the assembly of FIG. 4 that includes a component in a bay.

FIG. 5 shows an example of an assembly that includes a drive bay chassis 1610 and that includes examples of media drives 1160-1, 1160-2 and 1160-3 where each includes a connector and mounting features (see, e.g., the connector 161 and the mounting features 165 of the media drive 160 of FIG. 2). As shown, the drive bay chassis 1610 that includes opposing side walls 1616 and 1618 that define a width of a bay 1600-1, a width of a bay 1600-2 and a width of a bay 1600-3.

As shown in the example of FIG. 5, the drive bay chassis 1610 includes another pair of walls 1612 and 1614 that are operatively coupled to the side walls 1616 and 1618. In the example of FIG. 5, the walls 1612, 1614, 1616 and 1618 define a chamber therein. The chamber may be defined with respect to a depth along the y-axis and an opening in a x,z-plane.

In the example of FIG. 5, the wall 1616 includes a cover 1650 mounted thereto with brackets 1630-1, 1630-2 and 1630-3 disposed at least partially between the wall 1616 and the cover 1650. As shown, a pivotable latch 1660-1 is operatively coupled to the drive bay chassis 1610 for positioning of the bracket 1630-1, a pivotable latch 1660-2 is operatively coupled to the drive bay chassis 1610 for positioning of the bracket 1630-2 and a pivotable latch 1660-3 is operatively coupled to the drive bay chassis 1610 for positioning of the bracket 1630-3.

In the example of FIG. 5, the pivotable latch 1660-1 is shown in a first orientation that orients the bracket 1630-1 in a latchable state of at least one extension with respect to a drive in the drive bay 1600-1 and in a second orientation that orients the bracket 1630-1 in an unlatchable state of the at least one extension with respect to a drive in the drive bay 1600-1. As indicated by an arrow, the pivotable latch 1660-1 can be transitioned from the first orientation to the second orientation and vice versa.

Figure 6:
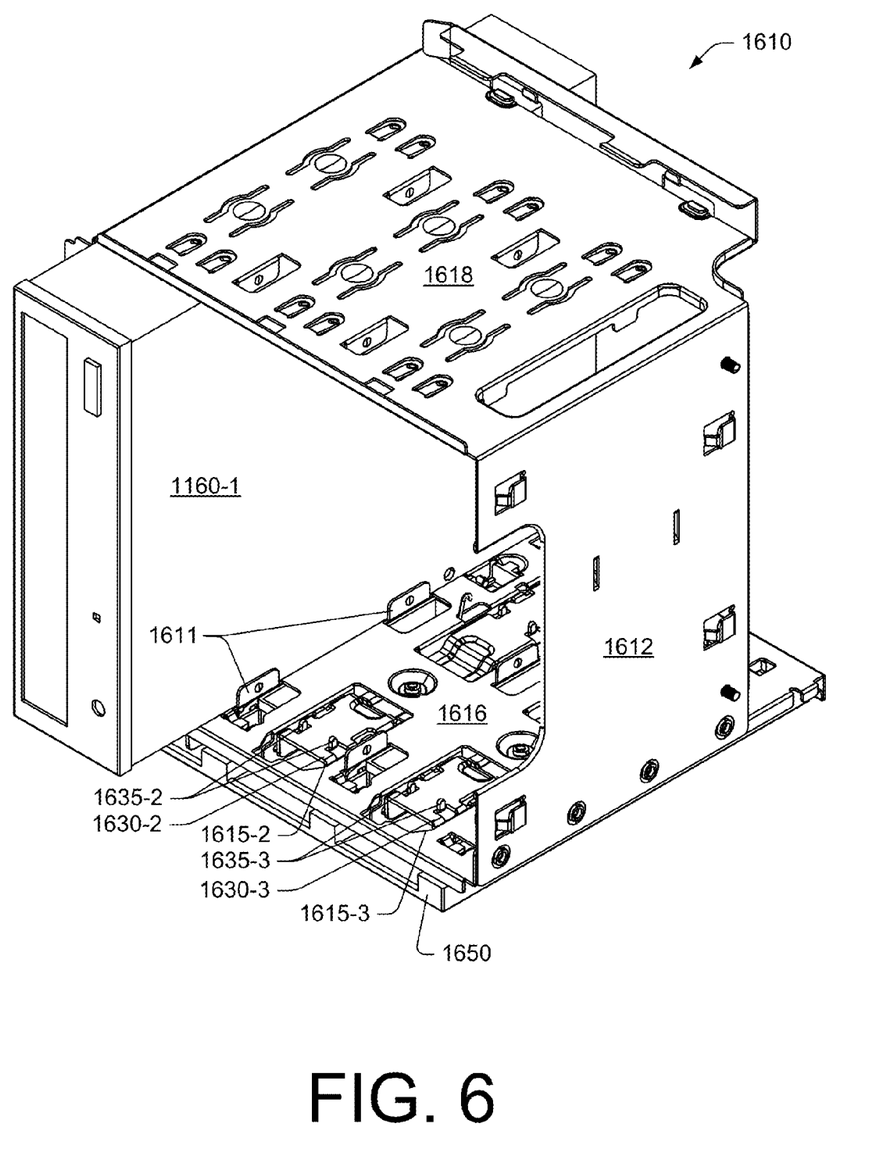
FIG. 6 is a diagram of a view of a portion of the assembly of FIG. 5.

FIG. 6 shows the drive bay chassis 1610 with the drive 1160-1 in the bay 1600-1 and without drives in the bays 1600-2 and 1600-3. As shown in the view of FIG. 6, the drive bay chassis 1610 may include guides 1611 that extend from the side wall 1616 (e.g., and optionally the side wall 1618) to guide a drive in one or more of the bays 1600-1, 1600-2 and 1600-3. The guides 1611 may be dividing guides that, on one side, guide a drive with respect to the bay 1600-1 and that, on another side, guide a drive with respect to the bay 1600-2.

In the view of FIG. 6, the bracket 1630-2 is shown as including at least one extension 1635-2 and the bracket 1630-3 is shown as including at least one extension 1635-3. Such extensions may extend via openings 1615-2 and 1615-3 in the wall 1616 of the drive bay chassis 1610. As mentioned, the pivotable latches 1660-2 and 1660-3 may be oriented to position the brackets 1630-2 and 1630-3, respectively, and thereby position the extensions 1635-2 and 1635-3, for example, in a latchable state and in an unlatchable state. In a latchable state, as an example, a drive may be translated into a bay and become latched; whereas, in an unlatchable state, a drive will not be latched merely by translating the drive into a bay. An unlatchable state may allow for removal of a drive from a bay.

Figure 7:
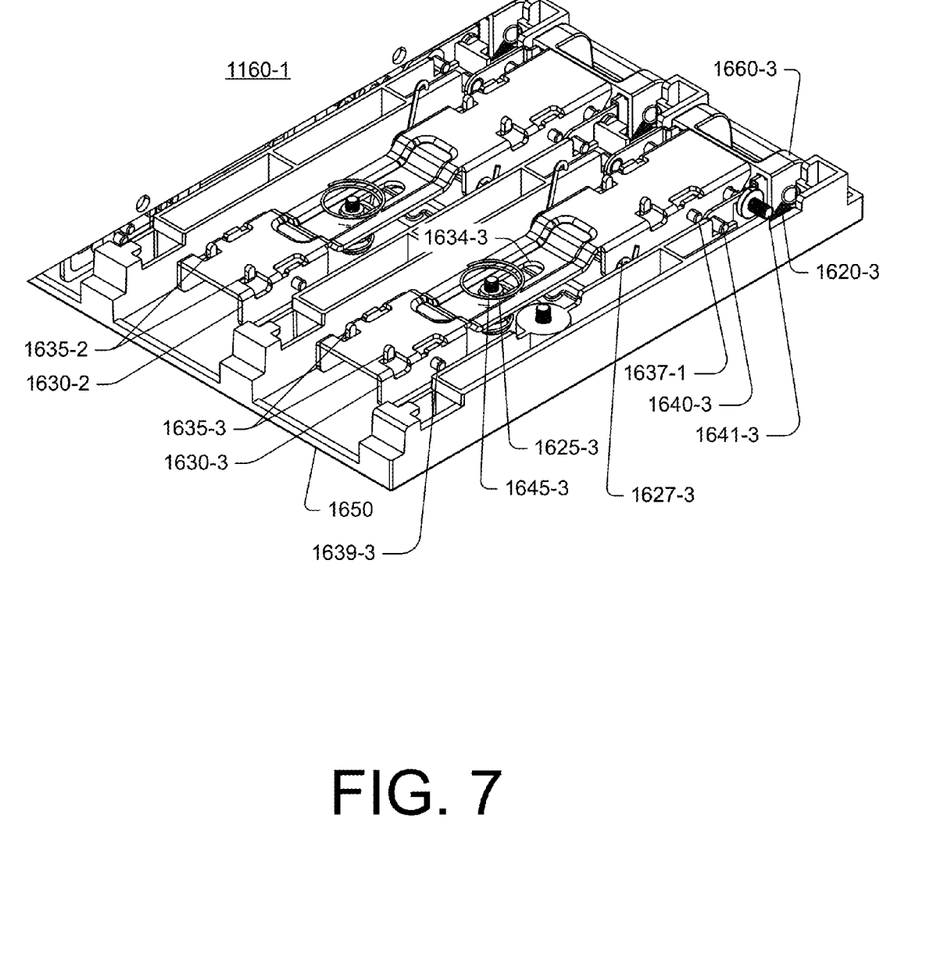
FIG. 7 is a series of diagrams of views of a portion of the assembly of FIG. 5.

FIG. 7 shows the cover 1650 and various components associated with the brackets 1630-2 and 1630-3 and the pivotable latches 1660-2 and 1660-3. In particular, various features are labeled for description of the bracket 1630-3 and the pivotable latch 1660-3.

In the example of FIG. 7, biasing mechanisms 1620-3, 1625-3 and 1627-3 are shown. The biasing mechanism 1620-3 may be a spring (e.g., a coil spring) that biases the pivotable latch 1660-3 in a latchable state (e.g., where one end of a spring may be coupled to a pivotable latch and another end of the spring may be coupled to a drive bay chassis, etc.). The biasing mechanism 1625-3 is disposed with respect to a post 1645-3 where the post 1645-3 is received by an opening 1634-3 of the bracket 1630-3. As shown, the opening 1634-3 may be a slot that allows for translation of the bracket 1630-3 with respect to the post 1645-3.

FIG. 7 also shows a pivot axel 1640-3 and a pin 1641-3 of the pivotable latch 1660-3 and pins 1637-3 and 1639-3 of the bracket 1630-3, for example, that extend outwardly from sides of the bracket 1630-3. As an example, pivoting of the pivotable latch 1660-3 about the pivot axel 1640-3 may cause the pin 1614-3 to apply force to the bracket 1630-3 to move the bracket 1630-3 in a manner that is guided by the pins 1637-3 and 1639-3 and, for example, guided at least in part by the biasing mechanism 1625-3 and the post 1645-3. Further, the biasing mechanism 1627-3 may apply a biasing force to the bracket 1630-3, for example, depending on whether or not a drive is positioned in the drive bay 1600-3 of the drive bay chassis 1610.

Figure 8:
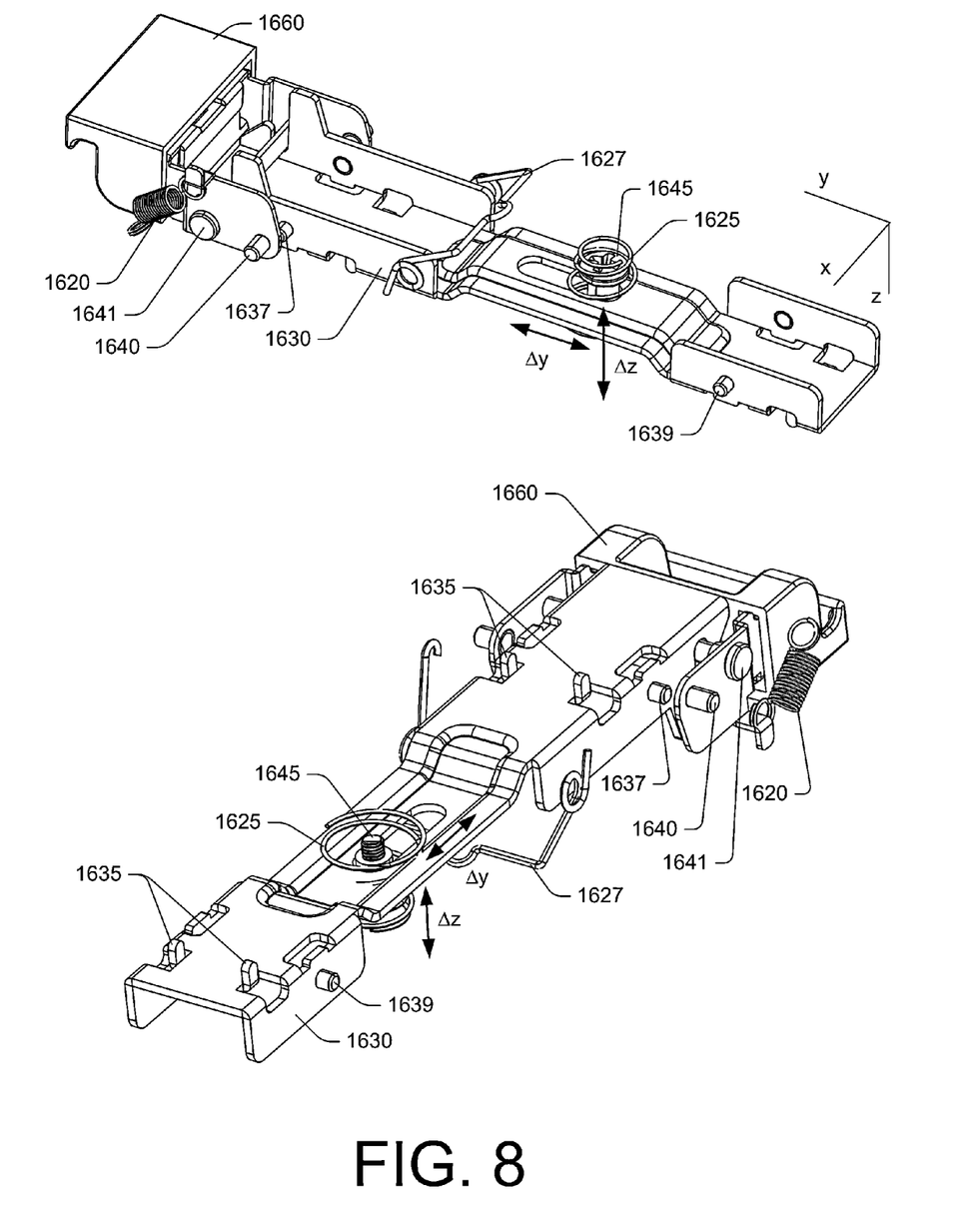
FIG. 8 is a diagram of views of a portion of the assembly of FIG. 5.

FIG. 8 shows views of one of the brackets with associated components, features, etc., for example, as described with respect to FIG. 7. As shown in FIG. 8, the bracket 1630 may include a first portion and a second portion where a bridge is disposed between the first portion and the second portion. As shown, the bridge includes the opening 1634. The first and second portions may each include a U-shaped cross-section formed, for example, from a base and sides where the pin 1637 extends outwardly from a side of the first portion and where the pin 1639 extends outwardly from a side of the second portion. The first portion may include two extensions and the second portion may include two extensions where, for example, the extensions corners of a rectangle. The corners of the rectangle may correspond to mounting features of a drive (see, e.g., the mounting features 165 of the media drive 160 of FIG. 2).

As an example, a wall of a drive bay chassis may include openings that can receive a first portion and a second portion of a bracket where the drive bay chassis includes a surface between the openings that may include a post, receive a post, etc. (e.g., consider a threaded opening that may receive a bolt, etc.). In such an example, a biasing mechanism may be positioned at least partially between the bracket and the surface optionally, for example, about the post. For example, consider the biasing mechanism 1625 and the post 1645 where the post may be a threaded component configured for receipt by a threaded opening in the wall 1616 of the drive bay chassis 1610. As illustrated in the example of FIG. 6, the first and second portions of a bracket may be received by openings in the wall 1616 of the drive bay chassis 1610 where the shape of a bridge between the first and second portions may be arched, for example, to allow for a clearance between the bracket and the wall 1616 that allows for movement of the first and second portions inwardly into a drive bay.

Figure 9:
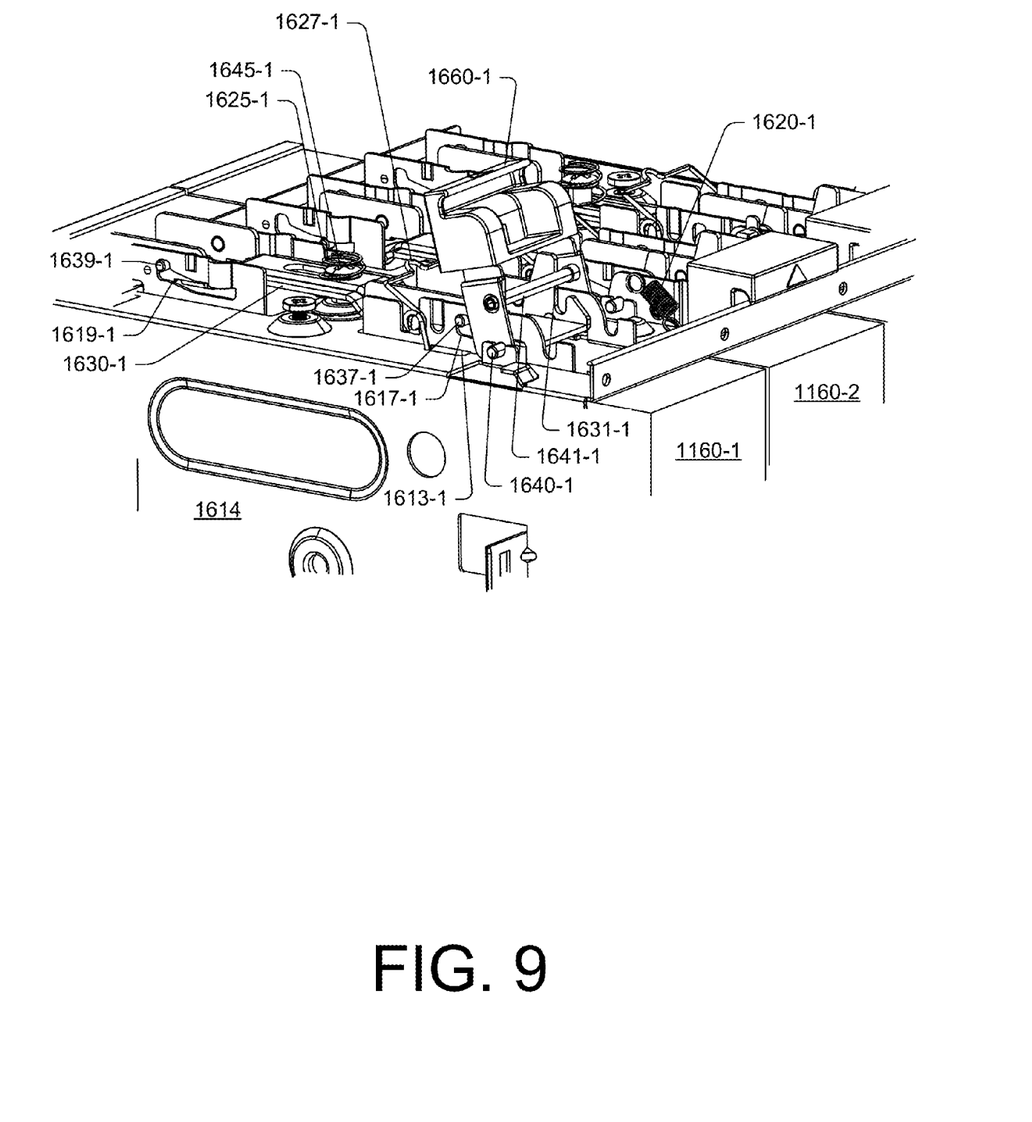
FIG. 9 is a diagram of a view of a portion of the assembly of FIG. 5.

FIG. 9 shows the bracket 1630-1 in an unlatchable state with the pivotable latch 1660-1 in an orientation that is pivoted away from the drive bay chassis 1610, which allows for translation of the drive 1160-1 in the bay 1600-1.

In FIG. 9, as the cover 1650 is not covering the brackets 1630-1, 1630-2 and 1630-3, various features of the drive bay chassis 1610 may be more readily illustrated. For example, the drive bay chassis 1610 includes a guide 1631-1 that extends outwardly from the wall 1616 where the guide 1631-1 includes slots 1617-1 and 1619-1 that receive pins 1637-1 and 1639-1, respectively. As shown, via pivoting of the pivotable latch 1660-1 about its pivot axel 1640-1, the pin 1641-1 fitted to the pivotable latch 1660-1 may apply a force to along a surface 1631-1 of the bracket 1630-1 to move the bracket 1630-1 at least in part away from the wall 1616 (see, e.g., the shape of the slots 1617-1 and 1619-1 of the guide 1631-1).

As to the biasing mechanism 1627-1, it may apply a biasing force to the bracket 1630-1, for example, where the drive 1160-1 is positioned in the bay 1600-1. It may also provide for clearance, for example, between the bracket 1630-1 and a surface of the cover 1650.

As an example, a method may include translating the drive 160 into the bay 1600-1 (e.g., or other bay) in a y-direction (e.g., as guided by the guides 1611) whereby a side of the drive 160 pushes the at least one extension 1635-1 of a bracket 1630-1 outwardly from the bay 1600-1, which may cause the biasing mechanism 1625-1 to experience strain (e.g., to stretch). In such a method, during translation, the mounting features (see, e.g., the mounting features 165) may reach a position that allows the at least one extension 1635-1 to be received thereby. For example, the at least one extension 1635 may be a prong or prongs and the mounting features 165 may be openings that can receive the prong or prongs. Once received, the drive 160 is latched in the bay 1600-1 at least in part by the biasing force exerted by the biasing mechanism 1625-1 on the bracket 1630-1.

The aforementioned method may be considered an installation or insertion method. In contrast, a method may be a removal method, for example, to remove a drive from a bay of the drive chassis 1610 (e.g., for maintenance, replacement, etc.).

As an example, a method may include pivoting the pivotable latch 1660-1 to move the bracket 1630-1 to cause the at least one extension to move outwardly away from the bay 1600-1 in a manner that causes the at least one extension 1635 and mounting features of a drive in the bay 1600-1 to disengage. Once disengaged, the drive may be translated along a y-direction for removal from the bay 1600-1.

A computing system can include a processor; memory accessible by the processor; a drive bay chassis that includes opposing side walls that define a width of a drive bay; a drive accessible by the processor and disposed in the drive bay; a biasing mechanism operatively coupled to the drive bay chassis; a movable bracket biased by the biasing mechanism where the bracket includes at least one extension, a first orientation with respect to the drive bay chassis that orients the bracket in a latchable state of the at least one extension with respect to the drive in the drive bay and a second orientation with respect to the drive bay chassis that orients the bracket in an unlatchable state of the at least one extension with respect to the drive in the drive bay. In such an example, the opposing side walls of the drive bay chassis may define a width of a plurality of drive bays.

As an example, a movable bracket may transition from a first orientation to a second orientation by pivotal movement of the movable bracket about a pivot axis.

As an example, a movable bracket may transition from a first orientation to a second orientation by pivotal movement of a latch about a pivot axis where the latch is operatively coupled to a drive bay chassis.

As an example, an assembly can include a chassis that includes opposing side walls that define a width of a drive bay; a biasing mechanism operatively coupled to the chassis; a pivotable bracket biased by the biasing mechanism where the pivotable bracket includes at least one extension, a first orientation with respect to the chassis that orients the pivotable bracket in a latchable state of the at least one extension with respect to a drive in the drive bay and a second orientation with respect to the chassis that orients the pivotable bracket in an unlatchable state of the at least one extension with respect to a drive in the drive bay. In such an example, the biasing mechanism may bias the pivotable bracket in the first orientation.

As an example, a pivotable bracket may include a U-shaped cross-section formed in part by a portion that extends over at least a height of a side wall where the portion includes at least one extension.

As an example, an assembly may include an axel operatively coupled to a chassis that defines a pivot axis of a pivotable bracket. As an example, a pivotable bracket may include a handle for applying a force that exceeds a biasing force of a biasing mechanism, for example, for transitioning the pivotable bracket from a first orientation to a second orientation.

As an example, an assembly may include two pivotable brackets. In such an example, one of the two pivotable brackets may be operatively coupled to a chassis with respect to one of opposing side walls of the chassis and the other of the two pivotable brackets may be operatively coupled to the chassis with respect to the other of the opposing side walls.

As an example, an assembly can include a chassis that includes opposing side walls that define a width of a drive bay; a biasing mechanism operatively coupled to one of the side walls; a bracket biased by the biasing mechanism where the bracket includes at least one extension that extends in a direction toward the drive bay; and a pivotable latch operatively coupled to the chassis where the pivotable latch includes a first orientation that orients the bracket in a latchable state of the at least one extension with respect to a drive in the drive bay and a second orientation that orients the bracket in an unlatchable state of the at least one extension with respect to a drive in the drive bay. In such an example, the assembly may include a post that extends from the one of the side walls where the biasing mechanism includes a spring disposed about the post.

As an example, a bracket may include a slot where a post is received by the slot. In such an example, the bracket may be translatable in at least two orthogonal directions with respect to the post.

As an example, an assembly may include a post that has a post length where a bracket includes at least one extension that has an extension length, for example, where the post length exceeds the extension length.

As an example, an assembly may include an axel where a pivotable latch includes a pivot axis defined by the axel.

As an example, an assembly may include a chassis where one side wall of the chassis and a bracket include guides and guide pins that guide movement of the bracket with respect to the one side wall.

As an example, an assembly can include a chassis and a bracket that includes a slotted portion disposed between two end portions where the two end portions include a plurality of extensions that extend toward a drive bay defined by opposing side walls of the chassis. In such an example, the one side wall of the chassis may include two openings to the drive bay where each of the two openings is configured for receipt of a respective one of the two end portions of the bracket.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 10:
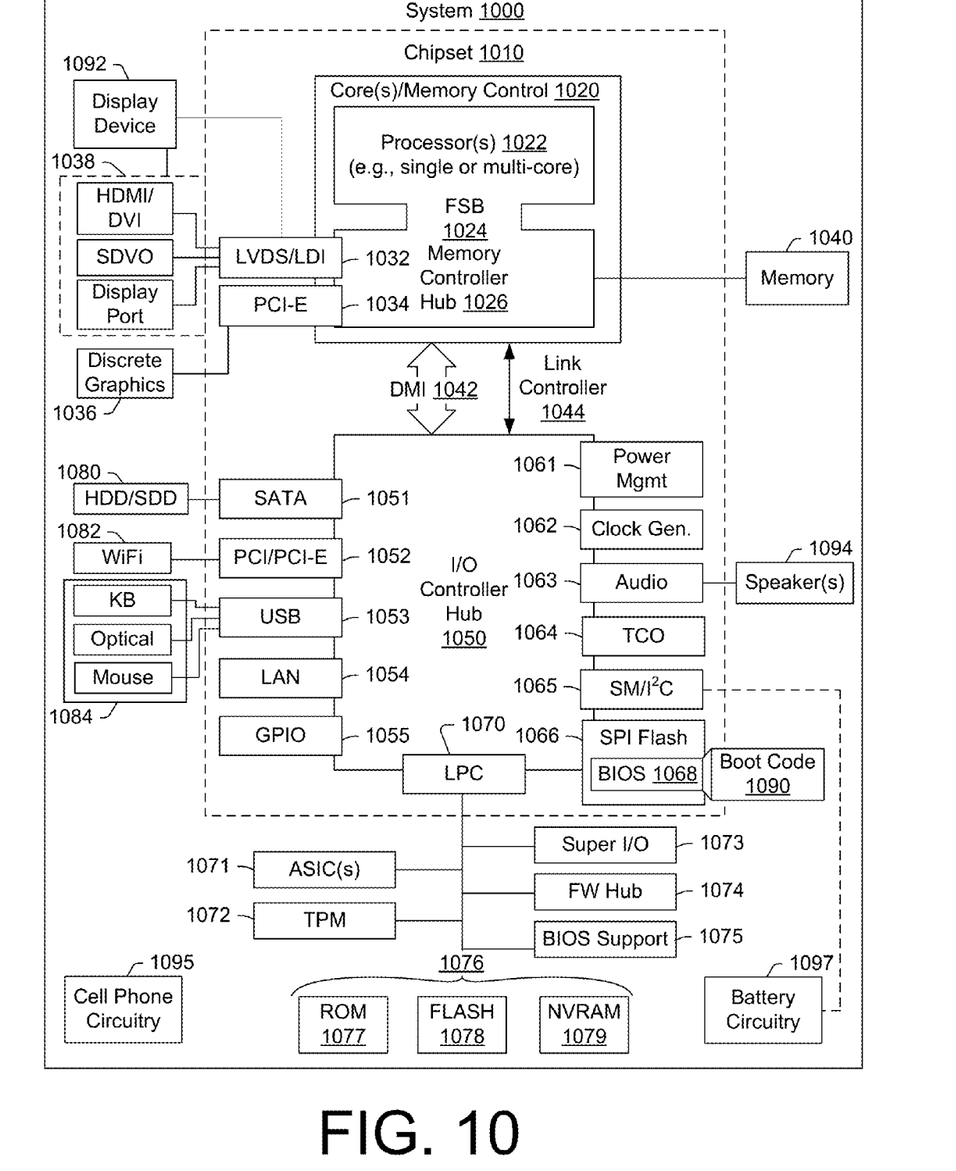
FIG. 10 is a diagram of an example of circuitry of a system, a device, etc.

While various examples of circuits or circuitry may be shown or discussed, FIG. 10 depicts a block diagram of an illustrative computer system 1000. The system 1000 may be a computer system, such as one of the ThinkCentre® or ThinkPad® series of personal computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 1000 (e.g., consider the Think-Server® server sold by Lenovo (US) Inc. of Morrisville, N.C.).

As shown in FIG. 10, the system 1000 includes a so-called chipset 1010. A chipset refers to a group of integrated circuits, or chips, that are designed to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and nonvolatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally including cell phone circuitry 1095, which may include GSM, CDMA, etc., types of circuitry configured for coordinated operation with one or more of the other features of the system 1000.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
a chassis that comprises opposing side walls that define a width of a drive bay;
a biasing mechanism operatively coupled to one of the side walls;
a post that extends from the one of the side walls wherein the biasing mechanism comprises a spring disposed about the post;
a bracket biased by the biasing mechanism wherein the bracket comprises at least one extension that extends in a direction toward the drive bay and wherein the bracket comprises a slot wherein the post is received by the slot; and
a pivotable latch operatively coupled to the chassis wherein the pivotable latch comprises
a first orientation that orients the bracket in a latchable state of the at least one extension with respect to a drive in the drive bay and
a second orientation that orients the bracket in an unlatchable state of the at least one extension with respect to a drive in the drive bay.

2. The assembly of claim 1 wherein the bracket is translatable in at least two orthogonal directions with respect to the post.

3. The assembly of claim 1 wherein the post comprises a post length and wherein the at least one extension comprises an extension length and wherein the post length exceeds the extension length.

4. The assembly of claim 1 comprising an axle wherein the pivotable latch comprises a pivot axis defined by the axle.

5. The assembly of claim 1 wherein the one side wall and the bracket comprise guide slots and guide pins that guide movement of the bracket with respect to the one side wall.

6. The assembly of claim 1 wherein the bracket comprises a slotted portion disposed between two end portions wherein the two end portions comprise a plurality of extensions that extend toward the drive bay.

7. The assembly of claim 6 wherein the one side wall of the chassis comprises two openings to the drive bay, each of the two openings being configured for receipt of a respective one of the two end portions of the bracket.

8. A computing system comprising:
a processor;
memory accessible by the processor;
a chassis that comprises opposing side walls that define a width of a drive bay;
a drive accessible by the processor and disposed in the drive bay;
a biasing mechanism operatively coupled to one of the side walls;
a post that extends from the one of the side walls wherein the biasing mechanism comprises a spring disposed about the post;
a bracket biased by the biasing mechanism wherein the bracket comprises at least one extension that extends in a direction toward the drive bay and wherein the bracket comprises a slot wherein the post is received by the slot; and
a pivotable latch operatively coupled to the chassis wherein the pivotable latch comprises
a first orientation that orients the bracket in a latchable state of the at least one extension with respect to the drive in the drive bay and
a second orientation that orients the bracket in an unlatchable state of the at least one extension with respect to the drive in the drive bay.

9. An assembly comprising:
a chassis that comprises opposing side walls that define a width of a drive bay;
a biasing mechanism operatively coupled to one of the side walls;
a bracket biased by the biasing mechanism wherein the bracket comprises at least one extension that extends in a direction toward the drive bay and wherein the one side wall and the bracket comprise guide slots and guide pins that guide movement of the bracket with respect to the one side wall; and
a pivotable latch operatively coupled to the chassis wherein the pivotable latch comprises
a first orientation that orients the bracket in a latchable state of the at least one extension with respect to a drive in the drive bay and
a second orientation that orients the bracket in an unlatchable state of the at least one extension with respect to a drive in the drive bay.

10. The assembly of claim 9 wherein the bracket comprises a slotted portion disposed between two end portions wherein the two end portions comprise a plurality of extensions that extend toward the drive bay.

11. The assembly of claim 10 wherein the one side wall of the chassis comprises two openings to the drive bay, each of the two openings being configured for receipt of a respective one of the two end portions of the bracket.

12. A computing system comprising:
a processor;
memory accessible by the processor;
a chassis that comprises opposing side walls that define a width of a drive bay;
a drive accessible by the processor and disposed in the drive bay;
a biasing mechanism operatively coupled to one of the side walls;
a bracket biased by the biasing mechanism wherein the bracket comprises at least one extension that extends in a direction toward the drive bay and wherein the one side wall and the bracket comprise guide slots and guide pins that guide movement of the bracket with respect to the one side wall; and
a pivotable latch operatively coupled to the chassis wherein the pivotable latch comprises
a first orientation that orients the bracket in a latchable state of the at least one extension with respect to the drive in the drive bay and
a second orientation that orients the bracket in an unlatchable state of the at least one extension with respect to the drive in the drive bay.

13. The computing system of claim 12 wherein the bracket comprises a slotted portion disposed between two end portions wherein the two end portions comprise a plurality of extensions that extend toward the drive bay.

14. The computing system of claim 13 wherein the one side wall of the chassis comprises two openings to the drive bay, each of the two openings being configured for receipt of a respective one of the two end portions of the bracket.

15. An assembly comprising:
a chassis that comprises opposing side walls that define a width of a drive bay;
a biasing mechanism operatively coupled to one of the side walls;
a bracket biased by the biasing mechanism wherein the bracket comprises at least one extension that extends in a direction toward the drive bay and wherein the bracket comprises a slotted portion disposed between two end portions wherein the two end portions comprise a plurality of extensions that extend toward the drive bay; and
a pivotable latch operatively coupled to the chassis wherein the pivotable latch comprises
a first orientation that orients the bracket in a latchable state of the at least one extension with respect to a drive in the drive bay and
a second orientation that orients the bracket in an unlatchable state of the at least one extension with respect to a drive in the drive bay.

16. The assembly of claim 15 wherein the one side wall of the chassis comprises two openings to the drive bay, each of the two openings being configured for receipt of a respective one of the two end portions of the bracket.

17. A computing system comprising:
a processor;
memory accessible by the processor;
a chassis that comprises opposing side walls that define a width of a drive bay;
a drive accessible by the processor and disposed in the drive bay;
a biasing mechanism operatively coupled to one of the side walls;
a bracket biased by the biasing mechanism wherein the bracket comprises at least one extension that extends in a direction toward the drive bay and wherein the bracket comprises a slotted portion disposed between two end portions wherein the two end portions comprise a plurality of extensions that extend toward the drive bay; and
a pivotable latch operatively coupled to the chassis wherein the pivotable latch comprises
a first orientation that orients the bracket in a latchable state of the at least one extension with respect to the drive in the drive bay and
a second orientation that orients the bracket in an unlatchable state of the at least one extension with respect to the drive in the drive bay.

18. The computing system of claim 17 wherein the one side wall of the chassis comprises two openings to the drive bay, each of the two openings being configured for receipt of a respective one of the two end portions of the bracket.

* * * * *